United States Patent [19]
Hashimoto

[11] Patent Number: 6,017,492
[45] Date of Patent: Jan. 25, 2000

[54] METHOD FOR THE DISPOSAL OF A MATERIAL

[75] Inventor: Yotaro Hashimoto, Shiga, Japan

[73] Assignee: Eiwa Co., Ltd., Kurita-gun, Japan

[21] Appl. No.: 08/875,705

[22] PCT Filed: Jan. 31, 1996

[86] PCT No.: PCT/JP96/00214

§ 371 Date: Aug. 1, 1997

§ 102(e) Date: Aug. 1, 1997

[87] PCT Pub. No.: WO96/23607

PCT Pub. Date: Aug. 8, 1996

[30] Foreign Application Priority Data

| Feb. 2, 1995 | [JP] | Japan | 7-016157 |
| Feb. 13, 1995 | [JP] | Japan | 7-024360 |
| May 19, 1995 | [JP] | Japan | 7-121933 |

[51] Int. Cl.[7] .................. A61L 2/08; A01N 9/00
[52] U.S. Cl. ........................... 422/27; 422/37
[58] Field of Search .................... 422/26, 27, 37; 210/767, 774

[56] References Cited

U.S. PATENT DOCUMENTS

| 3,604,895 | 9/1971 | Mackay | 422/27 |
| 3,687,612 | 8/1972 | Ernsy | 422/27 |
| 4,294,804 | 10/1981 | Baran | 422/27 |
| 4,447,399 | 5/1984 | Runnells et al. | 422/27 |
| 4,637,916 | 1/1987 | Hennebert et al. | 422/27 |
| 4,642,165 | 2/1987 | Bier | 422/27 |
| 4,710,350 | 12/1987 | Petersen | 422/37 |
| 4,717,544 | 1/1988 | Calcaterra et al. | 422/36 |
| 4,908,188 | 3/1990 | Jefferies, III et al. | 422/37 |
| 4,973,449 | 11/1990 | Kolstad et al. | 422/27 |
| 5,089,228 | 2/1992 | Meijer | 422/27 |
| 5,296,040 | 3/1994 | Dybus et al. | |
| 5,304,253 | 4/1994 | Grant | 134/26 |

FOREIGN PATENT DOCUMENTS

| 48-59157 | 8/1973 | Japan . |
| 49-42786 | 11/1974 | Japan . |
| 52-88579 | 7/1977 | Japan . |
| 2-1748 | 1/1990 | Japan . |
| 2-232073 | 9/1990 | Japan . |
| 4-370097 | 12/1992 | Japan . |
| 5-131038 | 5/1993 | Japan . |
| 7-506851 | 7/1995 | Japan . |

Primary Examiner—Robert J. Popovics
Attorney, Agent, or Firm—Jordan and Hamburg LLP

[57] ABSTRACT

A mixture of a methylene chloride solution as a halogen-containing solvent with water is put in a treatment tank to generate vapors. The generated methylene chloride vapor, water vapor, and occasionally surfactant vapor penetrate into a waste synthetic resin film (W). When the interior of the treatment tank (T) is evacuated, chloride ions (Cl−) and methylene free radicals (—CH$_2$—) generated from the vapors exhibit an oxidative effect for a longer time more strongly than usual. This breaks a long-chain hydrocarbon molecule constituting the synthetic resin or the like to carbohydrates, alcohols, and water, so that the waste is dissolved or decomposed. Further, harmful components of PCB and fat or oil components of animals, fish and the like are decomposed.

19 Claims, 11 Drawing Sheets

| OPERATING STEP \ VALVE OPEN AND CLOSE | 1 | 2 | 3 | 4 | 5 | 6 | 7 | 8 | 9 | 10 | 11 | 12 | 13 | VACUUM PUMP |
|---|---|---|---|---|---|---|---|---|---|---|---|---|---|---|
| DEAERATION | + | − | − | − | − | − | − | − | − | − | − | − | − | ON |
| FEED OF MIXTURE SOLUTION | − | − | + | + | − | − | − | − | − | − | − | − | − | OFF |
| EXPOSING TO MIXTURE SOLUTION VAPOR | − | − | − | − | − | − | + | − | + | − | − | − | − | OFF |
| RECOVERY OF MIXTURE SOLUTION | − | − | − | − | − | + | − | + | − | + | − | − | − | OFF |
| COOLING MIXTURE SOLUTION | + | − | + | − | + | − | − | − | − | − | − | − | − | OFF |
| RETURN OF MIXTURE SOLUTION TO TANK | − | + | − | − | − | − | − | − | − | − | + | − | − | ON |
| RECOVERY OF MIXTURE SOLUTION VAPOR | − | + | − | − | − | − | − | − | − | − | − | + | + | OFF |

METHOD FOR THE DISPOSAL OF A MATERIAL

FIELD OF THE INVENTION

The present invention relates to:

a method and equipment for forcedly oxidizing material under fumigating conditions, wherein the material is exposed to the vapor of a special mixture;

a method and equipment for the disposal of a waste synthetic resin film, such as polyvinyl chloride, which is extensively used for housing culture, malting culture and the like by farmers, using a mixture solution of methylene chloride and water as a strong oxidative mixture liquid in a treatment equipment;

a method and equipment for removal of harmful chlorine from a polyvinyl chloride film, as the type of waste synthetic resin film mentioned above;

a method and equipment for dissolving and decomposing enormous amounts of synthetic resin from collected trash bags including domestic garbage or waste films of synthetic resin prior to incineration thereof;

a method and equipment for opening the blocked cell walls of garbage or vegetation and dissolving water and fat thereof, thereby easing extraction of vegetable essence thereof, or easing a process for reducing the amount of water in the garbage;

a method and equipment for decomposing polychlorinated biphenyl (PCB), and a method and equipment for removal of fat from animal bones or fish body, which is used in a process of producing phosphatic manure of powdered bones comprising a step of removal of fat from bones of cattle or pigs, or a process of producing feed of powdered bones comprising a step of removing fat from bodies of sardine or horse mackerel.

DESCRIPTION OF RELATED ART

Conventionally, a general method of oxidizing material entails heating at a high temperature or soaking in an alkaline or acid solution.

However, it is impossible to use a conventional method for oxidizing material which is spoiled by heating at high temperature or by soaking in solution.

The present invention relates to a method of penetrating vapor or gas into such material, which cannot be heated at high temperature or soaked in a solution, in a processing tank having a low temperature about 50–150° C.

Also, waste synthetic resin film is usually dumped as general garbage and incinerated in a garbage furnace.

However, the synthetic resin film makes up large quantities of the garbage, and is of industrial waste, which is different from general trash or garbage in quality. A large amount of heat is generated when the synthetic resin film is incinerated. Chlorine gas is generated when polyvinyl chloride is burned up. The disposal of synthetic resin film costs too much as a public enterprise because of its acceleration of damage to a trash burner and its smoke pollution.

Therefore, some public bodies require a person who dumps a waste synthetic resin film to pay the expense of disposal thereof.

"PCB" is a general term for polychlorinated biphenyl, which is a mixture of chlorinated biphenyl having two, three, four, five or six chlorines. The PCB is easy to deal with because it is chemically, physically stable and it is liquid at normal temperatures. Although PCB is not used currently because it is harmful, it has ben primarily used as an insulator of a condenser or a transformer or as an ingredient of a pressure sensing paper or so on.

However, there still remains the problem about disposal of goods containing PCB. Detection of PCB from the ground, drainage or sludge constitutes a public problem.

It is extremely hard to resolve and make PCB harmless because PCB is stable.

Under these circumstances, the study for resolving and making PCB harmless is carried on. For example, exposing PCB to ultraviolet rays and culturing microorganisms in the ground containing PCB are known as methods of resolving PCB.

Such technology is disclosed in Japanese Patent Provisional Publication No. 4-370097, for example.

Also, as another method of resolution and disposal of PCB is known a technique to make PCB harmless by putting insulating oil containing PCB into a heating furnace, heating PCB at a temperature less than 110° C. so as to evaporate and separate PCB, and burning the PCB gas and the combustion gas of PCB so as to resolve in another furnace which is at a high temperature of from 1200 to 1500° C.

The technique is shown in the Japanese Patent Provisional Publication No. 2-232073.

Also, conventionally, a method of processing a pig bone or cow bone to remove meat for removal of fat is boiling the bones well. The bones are ground into powder after the process and are used as powdered bone. It is preferred to burn up the bone without processing for removal fat rather than to boil them, because boiling for removal of fat takes much time and boiling a large amount of bones at a time is impossible.

Furthermore, as for fish, a method of removing only fats has not been discovered. Whereby, fish is dried in a drying kiln without a process for removing fats, so that fish meal is made with fats on.

Therefore, in the case of making fish meal, it is hard to process fish because of its strong viscosity. It is not possible to lower the percentage of moisture content because of the fats, so that there is a problem that it is perishable. Also, fish meal is made without removing fish fat and is fed to a cow or a pig so that there is a problem that their meats smell of fish.

The present invention relates to a technique for producing high-grade fish meal which scarcely smells of fish.

SUMMARY OF THE INVENTION

The present invention relates to a technique of oxidizing material at a low temperature of 50 to 100° C. by penetrating gas generated from a mixture of methylene chloride solution and water and filling the gas in a treatment tank instead of soaking in solution.

The present invention provides a method and an equipment for melting, compressing and hardening a waste synthetic resin film into a solid state, which does not pollute the environment, at the lowest possible cost, when those who damp trash as a waste synthetic resin film are required to burn it up or bury it and to bear the cost.

The present invention dissolves and compresses a waste synthetic resin film before incineration by using the strong oxidation of chlorine ion ($Cl^-$) or methylene free radical ($-CH_2-$) generated from the mixture vapor of methylene chloride vapor and water vapor, so as to transform it into a solid state or liquid state, which is used for fuel.

The present invention dissolves and compresses a waste synthetic resin film, which is mostly used for a vinyl plastic hothouse cultivation or a malting film cultivation, so as to transform it into a small solid. Also, when the synthetic resin of the waste film is chloric synthetic resin, such as polyvinyl chlorine, the present invention decomposes harmful chlorine therefrom, so that chlorine gas is not generated when the disposed waste film is incinerated.

A waste synthetic resin film shortens the expected life span of a furnace because it generates a high heat or a poisonous gas in a furnace when it is incinerated. Also, the perfect incineration takes much time, thereby the modulus of an equipment for incineration goes down.

The present invention eliminates faults of prior arts such as those mentioned above.

The present invention relates to a method of disposal of waste effectively at a low cost by penetrating vapor generated from the mixture solution of methylene chloride solution, water and occasionally surfactant solution at a low temperature into a waste synthetic resin film so as to resolve, decompose and compress synthetic resin.

Large domestic garbage contains synthetic resin matter such as a trash bag, a pack for wrapping a daily dish, a dish for displaying, a polyethylene terephthalate bottle or so on. It is easy to separate metal material from garbage by a magnet or so on. However, it is difficult to separate synthetic resin from garbage.

The present invention relates to a method and an equipment for dissolving and extracting synthetic resin from garbage by using strong oxidation of a chlorine ion generated from the mixture vapor of methylene chloride vapor and water vapor, so as to refine the extracted synthetic resin into fuel for incineration in a furnace.

Also, the present invention easily dissolves and extracts water and fat or oil components in garbage or vegetation by penetrating vapor of the mixture solution of methylene chloride solution, water and occasionally surfactant solution into garbage or vegetation and opening the cell walls of vegetation.

A conventional method of disposal of PCB costs a lot and cannot make all PCB completely harmless. Also, a technique for disposal of PCB is not developed because the disposal thereof does not make a profit by itself.

The present invention provides a method of decomposing PCB, wherein all PCB are oxidized in a treatment tank of a low temperature at a time by strong oxidation of chlorine ion (Cl–) instead of a partial disposal such as exposing to ultraviolet. This method reduces a loss of chlorine hydrocarbon solution and enables chlorine hydrocarbon solution to be reduced, so that PCB can be decomposed at a low cost in public facilities.

Conventionally, a method of extracting fat from fish or bones of animals has not been discovered. The present invention relates to a method of making a "supper critical fluid" state, which is strongly oxidizable by exposing methylene chloride solution and water to vapor generated from the mixture of methylene chloride solution, water and occasionally surfactant solution at a low temperature and under a high pressure, so as to easily extract fat components from animal bones or fish.

DETAILED DESCRIPTION OF THE INVENTION

In the present invention, methylene chloride solvent solution Me is used as a halogenated solvent solution and a type of chloric solution.

However, halogenated solvent solution or chloride solution is not limited only to methylene chloride solvent solution Me. It can be trichloroethylene, 111-trichloroethylene, tetrachloroethylene, and so on. Methylene chloride solvent solution Me is one embodiment of a halogenated solvent solution or chloride solution.

Methylene chloride is a substance expressed by a chemical formula as $CH_2Cl_2$ and has a molecular weight of 84.93. This substance is sometimes called dichloromethane or dichloromethylene in addition to the general name as methylene chloride. Its boiling point and melting point are 40.4° C. and −96.8° C., respectively.

Surfactants added into the mixture of methylene chloride solvent solution Me and water Wa are classified as anionic, cationic, noninonic, or amphoteric. Anionic surfactants include alkyl sodium sulfate, amide sodium sulfate, secondary alkyl sodium sulfate, alkyl sodium sulfonate, amide sodium sulfonate, alkyl naphthalene sodium sulfate and the like.

Cationic surfactants include amine acetate salt, alkyl trimethyl ammonium chloride, dialkyl methyl ammonium chloride, alkyl pyridium halogenide, alkyl dimethyl benzyl ammonium chloride and the like.

Amphoteric surfactants include carboxylic acid type, sulfonic acid type and sulfate type surfactants.

Nonionic surfactants include polyoxyethylene alkylphenol, polyoxyethylene fatty alcohol, polyoxyethylene fatty acid, polyoxyethylenic acid amide, polyoxyethylenic fatty amine, and polypropylene glycol.

In the present invention, when there is an increase in alkalinity, $Cl_2$ is liable to be generated. To prevent the formation of $Cl_2$, polyoxyethylene alkylphenol in an alcoholic system, which is a nonionic surfactant relatively stable against acid and alkali, is effective. Also, anionic or cationic surfactants are effective.

Figure 1:
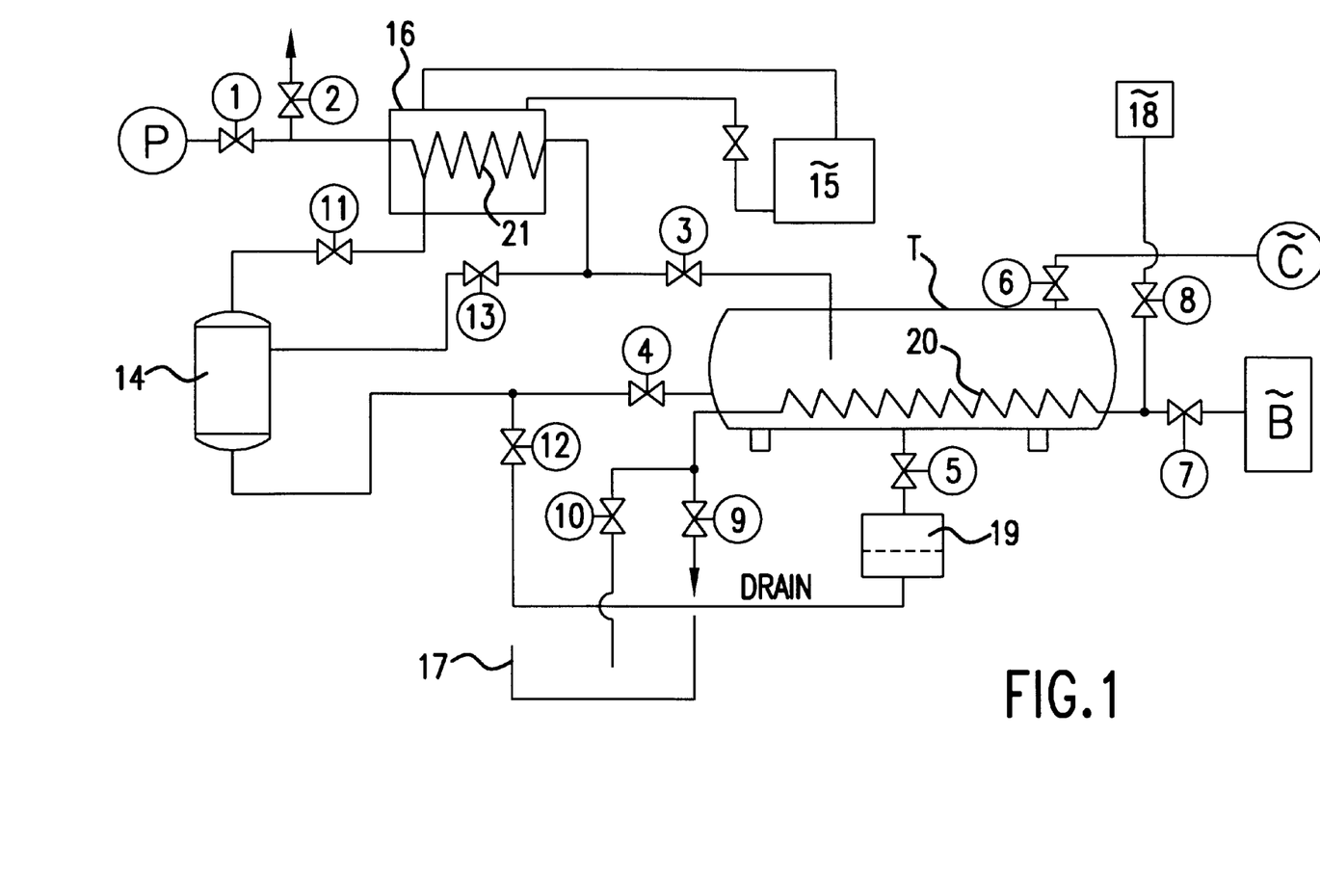
FIG. 1 is a diagram showing the fundamental construction of a method and equipment for the disposal of waste synthetic resin film according to the present invention.
Figure 2:
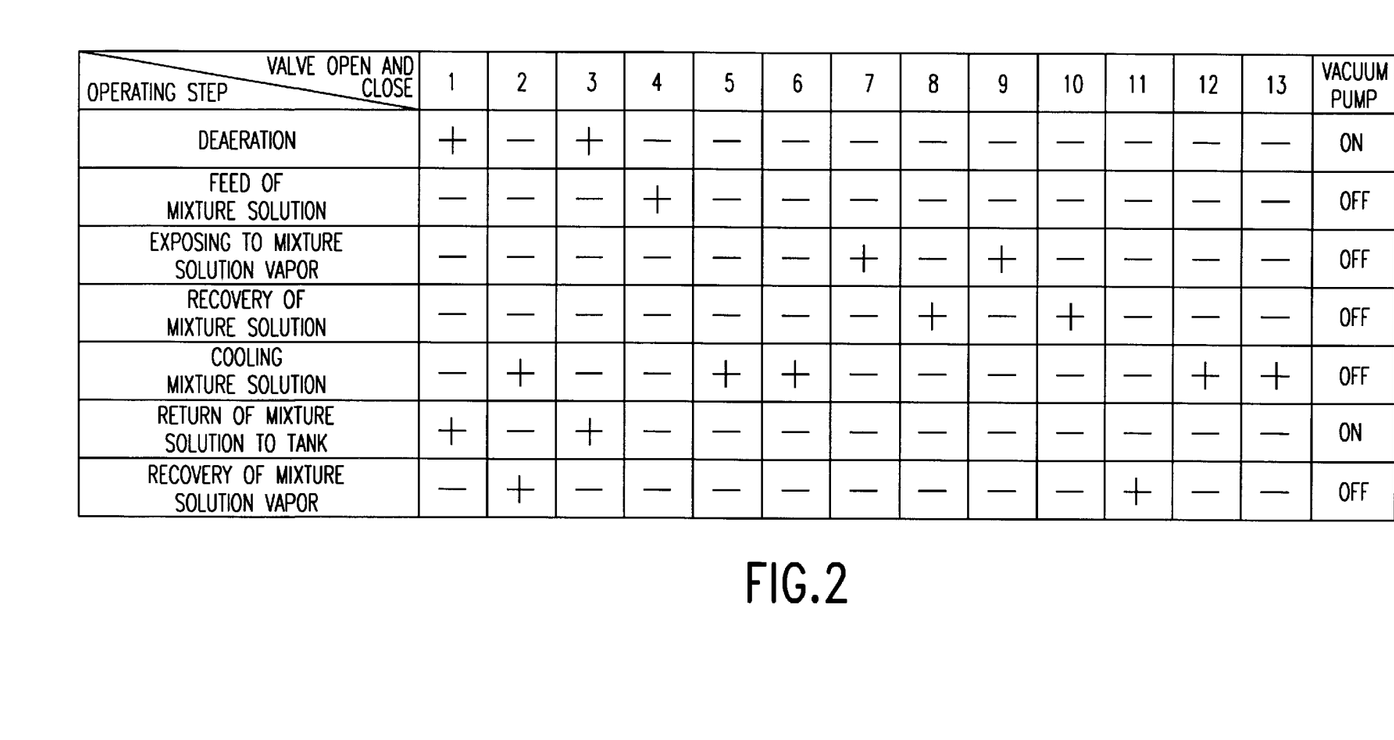
FIG. 2 is a chart showing processes and steps in the method of disposal of waste synthetic resin film by means of indication as ON and OFF of a valve mechanism.
Figure 3:
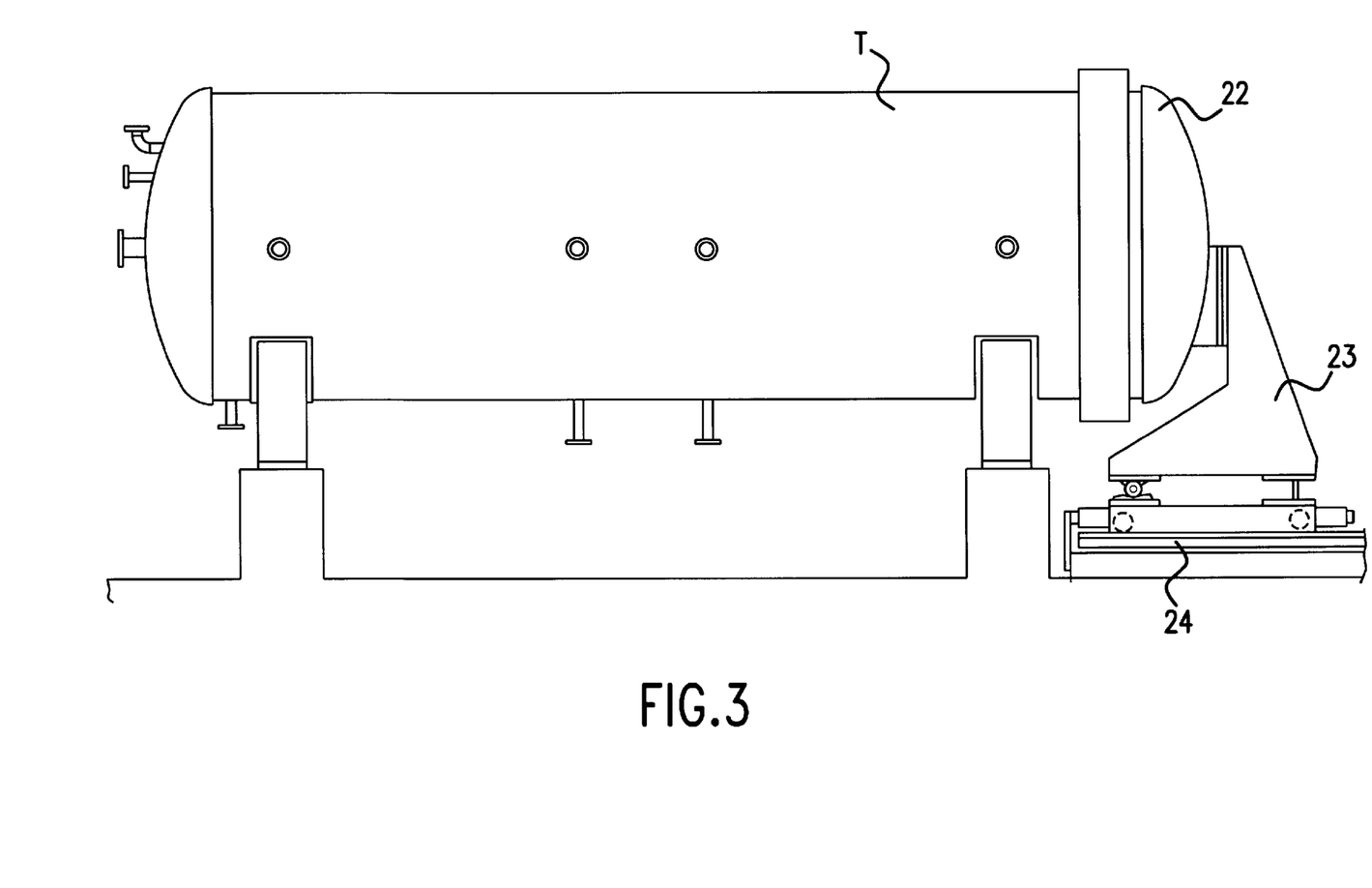
FIG. 3 is a side view of a treatment tank T, a lid 22, and a mounting table 26.
Figure 4:
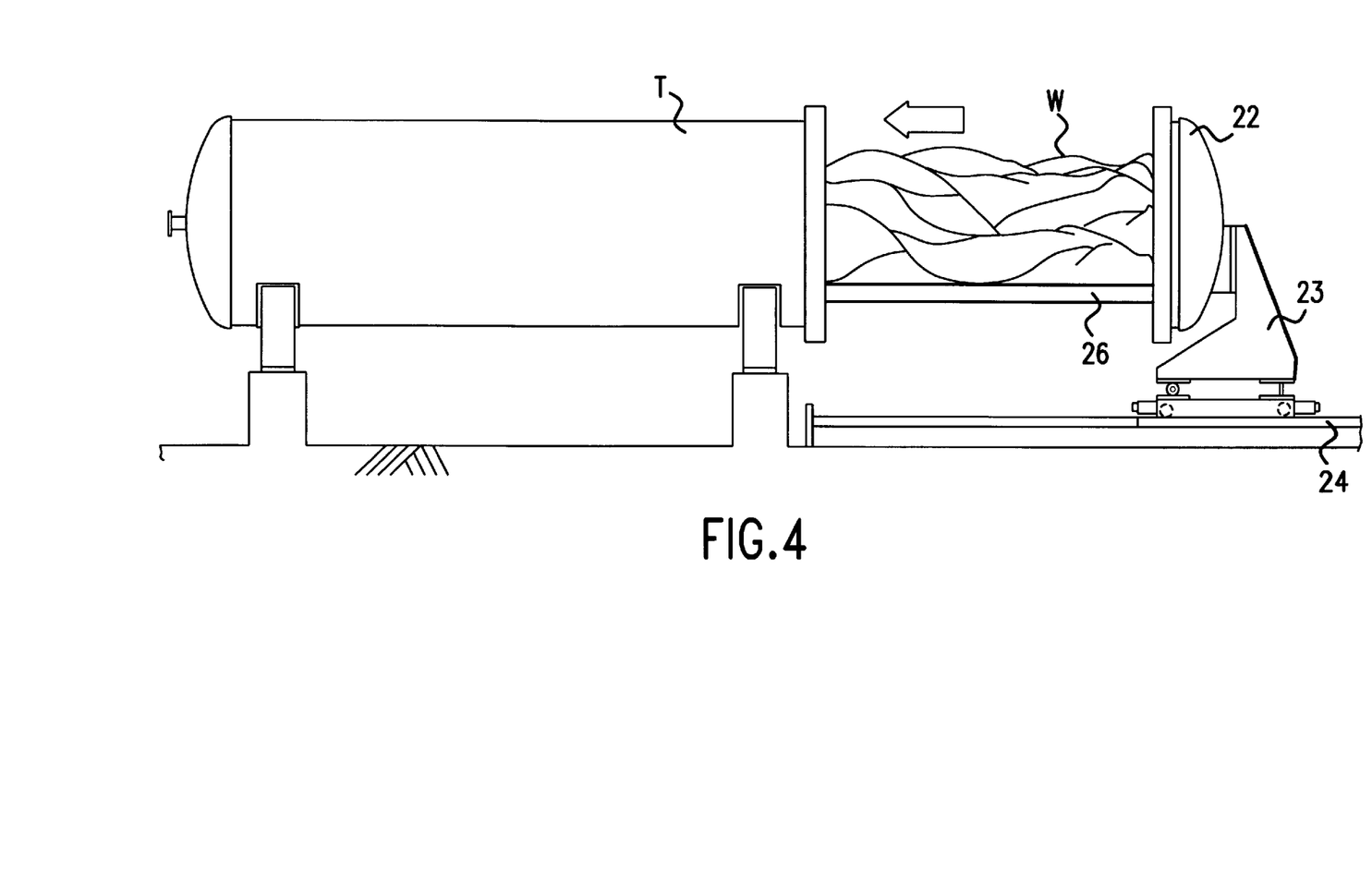
FIG. 4 is a side view showing a state in which waste synthetic resin film W is mounted on the table 26 and is enclosed into the treatment tank T.
Figure 5:
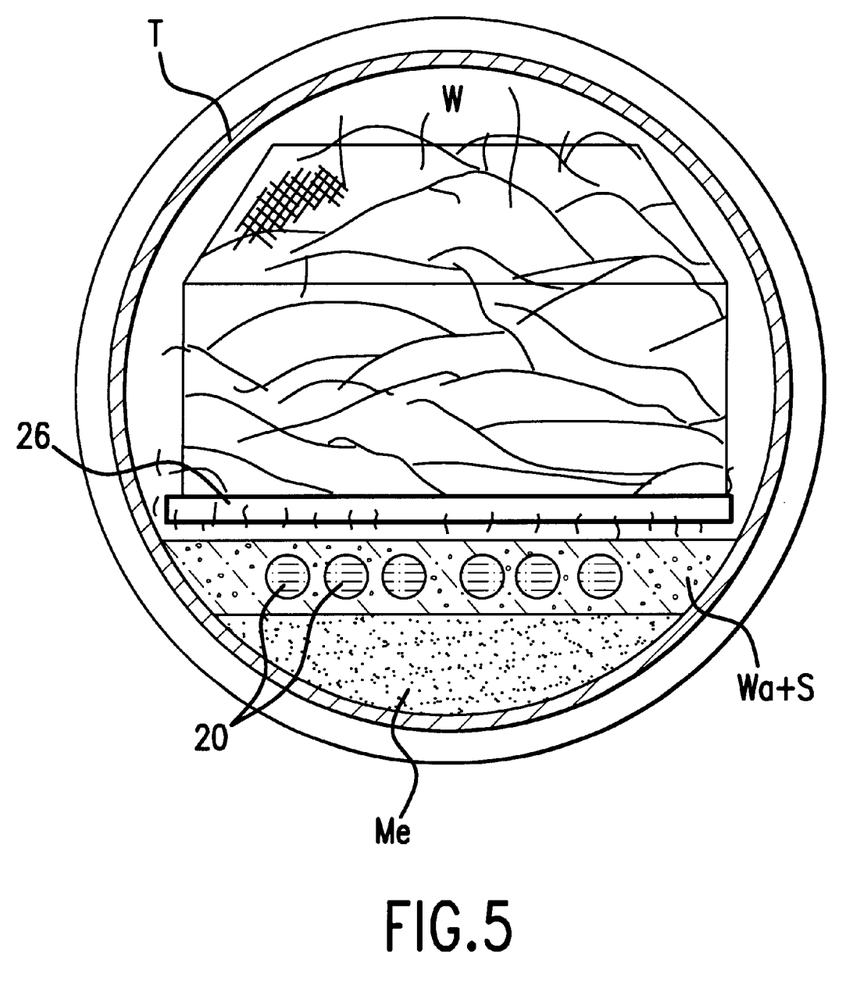
FIG. 5 is a sectional front view of the same of FIG. 4.
Figure 6:
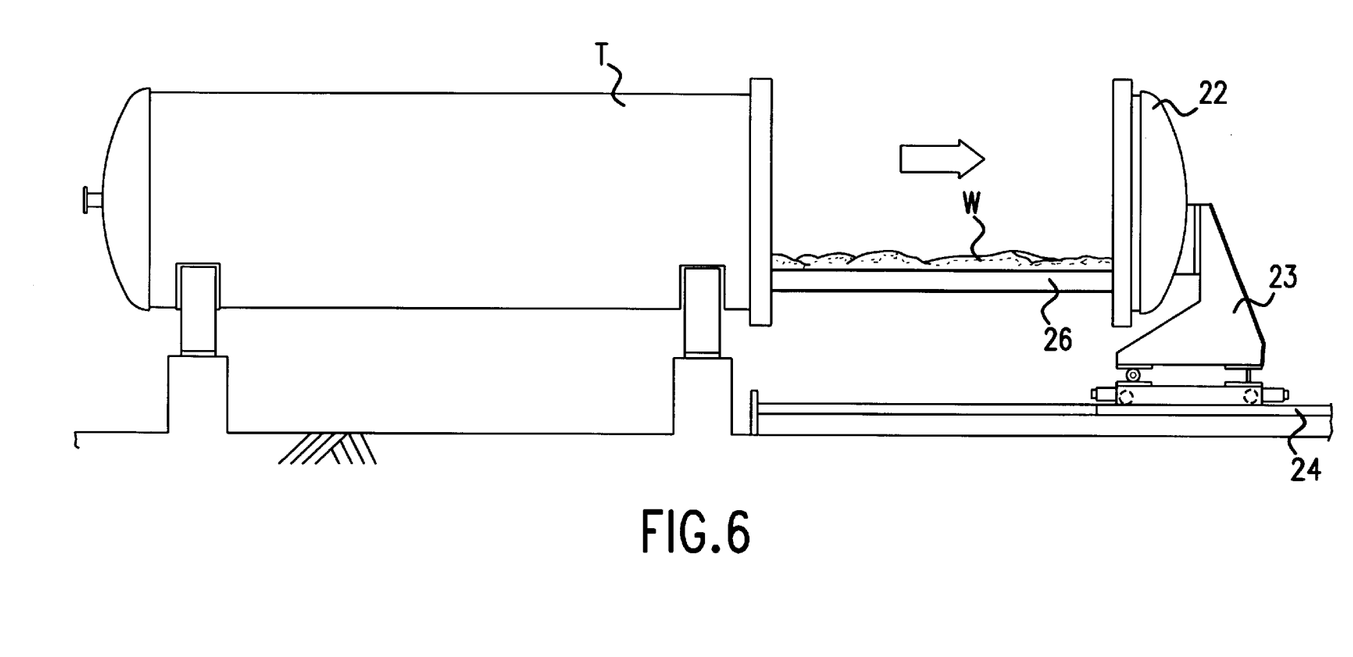
FIG. 6 is a side view showing a state in which waste synthetic resin film W is taken out from the treatment tank T after process.
Figure 7:
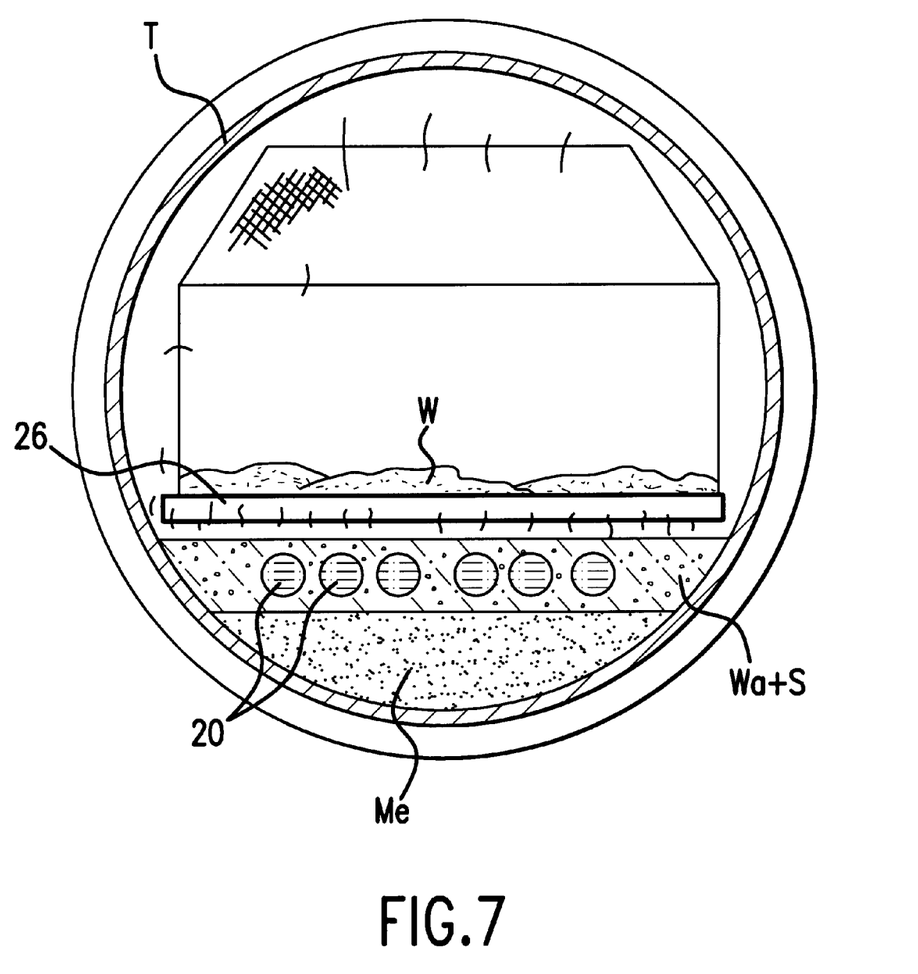
FIG. 7 is a sectional front view of the same of FIG. 6.

FIG. 1 is a diagram showing the fundamental composition of a method and an equipment for the disposal of material such as waste. FIG. 2 is a view showing each of the steps in the method of disposal of materials such as waste by means of indicating the ON and OFF position of a valve mechanism. FIG. 3 is a side view of a treatment tank T and lid 22. FIG. 4 is a side view of the same showing a state in which waste synthetic resin film W is mounted on a table 26 and enclosed in the tank T. FIG. 5 is a sectional front view of FIG. 4. FIG. 6 is a side view showing a state in which waste synthetic resin film W is taken out from the tank T after processing. FIG. 7 is a sectional front view of FIG. 6.

Referring to FIGS. 3, 4, 5, 6 and 7, the structure including a treatment tank T, a lid 22, and a table 26 will be described. The treatment tank T is constructed as a pressure vessel adapted to endure such degrees of pressure as 50 Torr for deaeration and a vacuum of 200 Torr for recovery of methylene chloride required in the method of and equipment for the disposal of waste matter according to the present invention.

The lid 22 is disposed in the front side of the vessel and is structurally integral with the table 26. The table 26 is displaced on a rail 24 provided in the treatment tank T and the lid 22 is movable on the rail 24 below a lid supporting part 23 so as to move integrally with the lid supporting part 23.

A waste synthetic resin film W as an object to be processed, which is soiled with earth and has been shredded, is mounted on the table 26 which is withdrawn and advanced integrally with the lid 22. Chlorine ion (Cl$^-$) or methylene free radical (—CH2—) can easily permeate the entire waste synthetic resin film W, which has been shredded.

In the state that the table 26 has been thrusted into and retained in the inner space of the treatment tank T, pressure is applied to said inner part after the lid 22 closes the treatment tank T hermetically and unmovably.

Heating/cooling pipes 20 are arranged on the inner bottom of the treatment tank T and, when heating is intended, steam having a temperature amounting to 100 and several tens ° C. is supplied from a boiler B (as represented in FIG. 1). For cooling, water in a cooling water tank 18 is supplied. A mixture solution of methylene chloride and water may be poured into the treatment tank T as it is or after it is changed into mixed gas in a preparatory tank. In the embodiment shown in FIG. 1, the mixture fed into the treatment tank T is a liquid.

The mixture solution, while kept as it is, is poured into the treatment tank T to such a level as will immerse the heating/cooling pipes 20. Then steam having a temperature amounting to 100 and several tens ° C. is fed from the boiler B into the heating/cooling pipes 20. Both the methylene chloride, having a boiling point of 40° C., and water turn into vapor. Stream and vapor of methylene chloride are fed at the same time to promote the permeation of vapor the of methylene chloride into the inside of the waste synthetic resin film W.

In the present invention, as shown in FIGS. 5 and 7, the mixture solution of methylene chloride, water and surfactant reaches a level no higher than that below the table 26, so that the waste synthetic resin film W is not immersed in the mixture solution even at the highest level.

The method of the present invention entirely depends on fumigation in which the waste synthetic resin film W is processed with the vapor of the mixture solution which it absorbs.

FIGS. 6 and 7 show a state of removing the waste synthetic resin film W after processing. The waste synthetic resin film W mounted on the table 26 is melted and compressed into a solid state on the surface of the table 26. The processed waste synthetic resin film W may be torn off and burned up as fuel in a burner or a furnace as it is or it may be decomposed by pyrolysis and distillation and changed into oil for fuel.

Referring to FIG. 1, the fundamental composition of the method and equipment of the present invention will be described.

As an equipment, the main components thereof are the treatment tank T and a mixture solution tank 14, wherein a mixture solution of methylene chloride, water and surfactant is thrown into the mixture solution tank 14. The boiler B, as previously described, heats the mixture solution and a compressor C operates to apply pressure when returning mixture solution from the treatment tank T to the mixture solution tank 14 after completion of processing.

A vacuum pump P operates for absorbing methylene chloride vapor remaining in the inner space of the treatment tank T and the inside of the waste synthetic resin film W after the mixture solution is forcedly discharged by the compressor C. The absorbed methylene chloride vapor, which can not be discharged into the atmosphere, is cooled and liquefied in a condenser 16 and is returned to the mixture solution tank 14 through a condenser pipe 21. A chiller 15 cools cooling water in said condenser 16. A filter 19 is provided for filtering off impurities such as dust in the mixture solution forced out from the treatment tank T by the compressor C. A cooling water tank 17 is a receptacle for cooling water used for liquefaction of the mixture solution vapor.

Solenoid valves are arranged at various portions. Such solenoid valves are constructed to be opened and closed by an automatic control device at fixed intervals and automatically operated, as shown in FIG. 2. They are operated in steplike order such as "deaeration", "feed of mixture solution", "exposing to mixture solution vapor", "cooling of mixture solution", "return of mixture solution to tank", "recovery of mixture solution vapor", and "recovery of mixture solution in condenser". At the same time, the compressor C, boiler B, vacuum pump P, and a chiller 15 are automatically driven and stopped. Collectively. in this embodiment, a mixture ratio by weight between methylene chloride solution and water is set at 4:1. A temperature in the treatment tank T is about 80° C. One cycle of this process is designed to be completed within 24 hours.

FIG. 2 shows a state of the solenoid valve in every step in the method and equipment for the disposal of waste synthetic resin film. In the step of "deaeration", the vacuum pump P is driven. A solenoid valve 1 in the circuit to connect the vacuum pump P to the condenser 16 and another valve 3 adapting the condenser 16 to communicate with the treatment tank T is opened. The other solenoid valves are all closed. In this way, the inner space of the treatment tank T is caused to become a vacuum to a degree of about 50 Torr, whereby air in the waste synthetic resin film W is drawn out.

Then, in the step of "feed of mixture solution", a solenoid valve 4 for adapting the treatment tank T to communicate with the mixture solution tank 14 is opened, whereas the other valves are closed. Thus, the mixture solution moves to the inner part of the treatment tank T so that the level of solution in the mixture solution tank may be flush with that in the treatment tank T, since both tanks are arranged at approximately the same levels.

In the step of "exposing to mixture solution vapor", the solenoid valve 7 between the boiler B and the treatment tank T and another solenoid valve 9 adapting the treatment tank T to communicate with a drain are opened, whereas the other valves are closed. Then, steam of high temperature coming from the boiler B is fed into the heating/cooling pipes 20 and the mixture solution in the treatment tank T changes into methylene chloride vapor, water vapor and, optionally, surfactant vapor so as to permeate the waste synthetic resin film W. The step of "exposing to mixture solution vapor" continues for about 8–24 hours. The duration of this process changes with the temperature used for the process, the type of synthetic resin and the like.

The step of "recovery of mixture solution" will be described. In this case, a solenoid valve 8 adapting the cooling water tank 18 to communicate with the treatment tank T and another valve 10 adapting the processing tank T to communicate with the cooling tank 17 are opened, whereas the other valves are closed. Thus, cooling water passes through the inner part of the heating/cooling pipes 20 and a temperature in the inner part of the treatment tank T falls below 40° C., which is the boiling point of methylene chloride, whereby both methylene chloride vapor and water vapor are returned to a liquid state.

The step of "cooling mixture solution" will be described. In this case, a solenoid valve 2 is opened for escape of air in the treatment tank T and another solenoid valve 5 under the treatment tank T as well as another solenoid valve 6 adapting the compressor C to communicate with the treatment tank T are opened so as to drive the compressor C. On the other hand, a solenoid valve 12 between the filter 19 and the mixture solution tank 14 and another valve 13 connecting the mixture solution tank 14 to the atmosphere are opened. Then, some degree of pressure acts on the inner part of the treatment tank T and a liquefied mixture vapor is forcedly returned to the mixture solution tank 14.

The step of "return of mixture solution to tank" will be described. In this case, the vacuum pump P is driven. A solenoid valve 1 adapting the vacuum pump P to communicate with the condenser 16 and another valve 3 adapting the condenser 16 to communicate with the treatment tank T are opened. The other valves are closed. In this state, methylene chloride vapor present in the treatment tank T and having permeated into the waste synthetic resin film W is recovered by the vacuum pump P. In this case, the degree of pressure of the interior of the treatment tank T is lowered to about 200 Torr.

In the step of "recovery of mixture solution vapor", a solenoid valve 2 communicating with the atmosphere and another solenoid valve 11 adapting the condenser pipe 21 to communicate with the mixture solution tank 14 are opened. Hence, recovery of mixture solution such as methylene chloride remaining in the condenser pipe 21 of the condenser 16 can be recovered into the mixture solution tank 14. A series of such steps as above is completed after a lapse of 24 hours.

Referring to FIGS. 5 and 7, a description will be made on the section of the inner part of the treatment tank T in operation of processing. The heating/cooling pipes 20 are disposed on the inner lower part of the treatment tank T and the table 26 is disposed above said heating/cooling pipes 20. The waste synthetic resin film W is mounted on the table 26.

The mixture of water Wa, surfactant solution S, and methylene chloride solution Me is poured into the treatment tank T, so that the level of the mixture solution comes to be higher than the top of the heating/cooling pipes 20, but not high enough to immerse the waste synthetic resin film W on the table 26 into the solution.

Water Wa and surfactant solution S having a specific weight of 1.00 and 1.04, respectively, are at approximately the same levels and the latter S dissolves into the former W to be in one body, thereby composing a layer of "water Wa+surfactant solution S" as shown in FIGS. 5 and 7. In contrast with this, methylene chloride solution Me, having the specific weight of 1.33 and being incapable of dissolving into water Wa, forms a layer beneath the layer of "water Wa+surfactant solution S".

When steam heated to 160° C. is fed into the heating/cooling pipes 20 disposed in the "water Wa+surfactant S" layer, the temperature of the portion around the heating/cooling pipes 20 rises. The heating/cooling pipes 20 are arranged in the layer of "water Wa+surfactant solution S", so that the temperature of the portion of the layer near the heating/cooling pipes 20 rises earlier than that of the other portions.

When the temperature of the heating/cooling pipes 20 gradually rises and reaches about 40° C., methylene chloride solution Me is heated to reach the boiling point thereof. It turns into a mixture of methylene chloride vapor and bubbles, which passes through the layer of "water Wa+surfactant solution S", and reaches the waste synthetic resin film W so as to permeate the film W.

In the processing of a usual waste synthetic resin film W, the processing operation continues in a state that the mixture solution is heated to about 50° C. and methylene chloride vapor passes through the mixture solution of water and surfactant solution S and reaches the waste synthetic resin film W.

In the case where a waste synthetic resin film W is difficult to process, the mixture solution is heated to about 100° C., so that water Wa and surfactant solution S are turned into vapor in addition to methylene chloride.

The waste synthetic resin film W is oxidized and melted by a chlorine ion (Cl–) and a methylene free radical ($-CH_2-$) generated from methylene chloride vapor and water vapor of the present invention.

A temperature for heating a mixture solution ranges from 50 to 150° C., so that chlorine ion (Cl–) and methylene free radical ($-CH_2-$) can be generated at a low temperature and the processing temperature is decreased. The waste synthetic resin film W can be processed without calcination at a high temperature.

A mixture ratio by weight between methylene chloride solution and water is set at about 1:1 to 4:1 to generate the best state of chlorine ion (Cl–) and methylene free radical ($-CH_2-$).

Additionally, methylene chloride vapor permeates the waste synthetic resin film W along with the surfactant solution S. Hence, decomposition and removal of synthetic resin is improved.

Surfactant solution S mixed with methylene chloride vapor passing through organic holes of the waste synthetic resin film W improves decomposition of synthetic resin.

Furthermore, before permeation of methylene chloride vapor, water vapor and surfactant permeate, the waste synthetic resin film W is deaerated in the interior of the treatment tank T, which is made to be a vacuum so that methylene chloride vapor can permeate the waste synthetic resin film W in the state that the air within the waste synthetic resin film W is extracted therefrom. Accordingly, methylene chloride vapor can permeate more deeply than ever.

Thus, the methylene chloride vapor easily permeates the waste synthetic resin film and oxidizes it.

Production of a large quantity of methylene chloride vapor at a low temperature does not require a high temperature for the disposal of the interior of the treatment tank T.

While said methylene chloride Me passes through water Wa and surfactant solution S, $C_2$ "chlorine gas" generated from methylene chloride is absorbed into water Wa and controlled not to be generated further for preventing unfavorable influence thereof on processing.

If a mixture ratio by weight between methylene chloride solution, water and surfactant is set at 5:4.5:0.5, the highest effect of removing chlorine can be obtained.

In this way, because of a processing of heating the mixture solution of water Wa, surfactant S, and methylene chloride Me by the heating/cooling pipes 20, the vapor of methylene chloride Me evaporates into the interior of the treatment tank T after passing through water Wa and surfactant solution S, thereby $Cl_2$ is reduced.

The oxidized and dissolved waste synthetic resin film W remains as it is on the table 26 or is removed therefrom. The dissolved waste synthetic resin film W has been changed into a solid state and its contents is one tenth as large as it was. This solid is thrown in a furnace or a burner as a solid fuel.

The waste synthetic resin film W, which is dissolved and compressed by the present invention, is taken out separately and dissolved by heat and a component part of oil is taken out easily by a fining separator. This is burned up the same as kerosene and can be offered as raw material for a garbage furnace or the production of electric power by incineration or heating by incineration.

By the method of and the equipment for the disposal of waste synthetic resin film of the present invention, a chloric synthetic resin film such as polyvinyl chlorine is processed, thereupon, chlorine is reduced to one-tenth. Therefore, the generation of chlorine gas is minimized and does not cause pollution when the solid or liquid resulting processing is burned up.

Next, other embodiments of methods and equipments for disposal of other materials will be explained in accordance with FIGS. 9 to 11.

Figure 9:
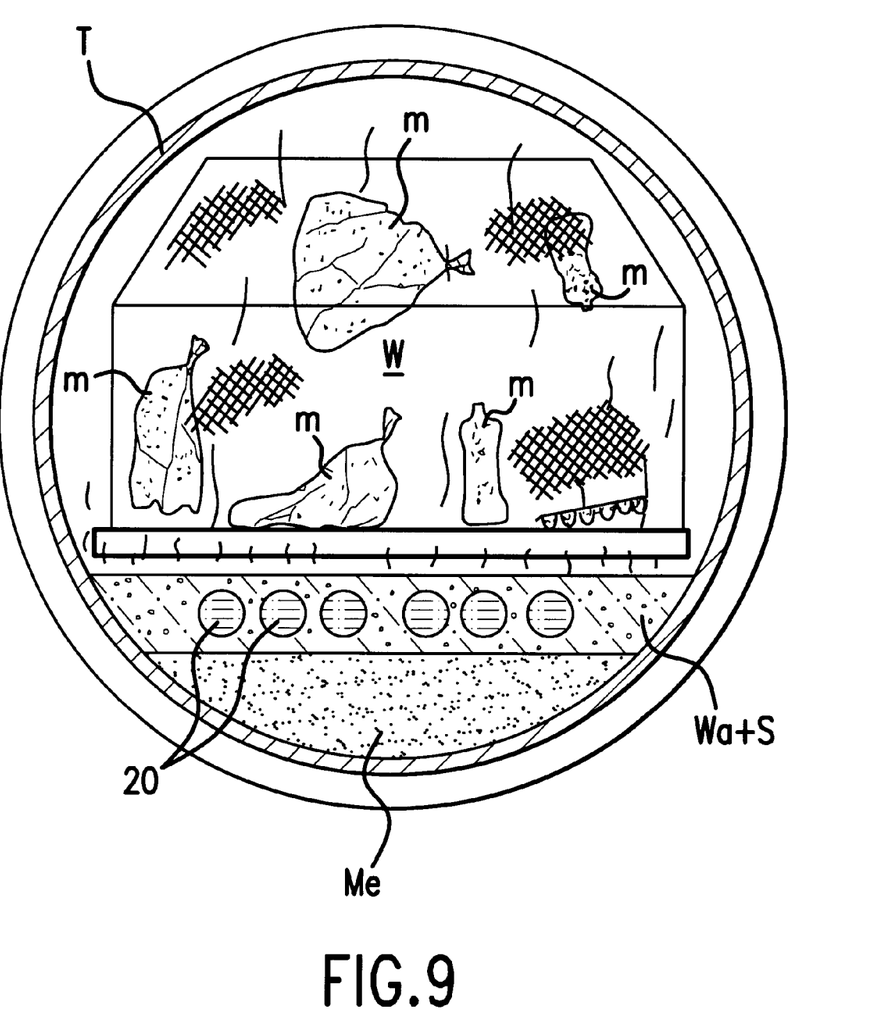
FIG. 9 is a sectional front view showing a state in which waste W containing synthetic resin matter m is mounting on the table 26 and processed.

FIG. 9 shows a state wherein waste W mixed synthetic resin materials m is mounted on the table 26 and processed.

Figure 10:
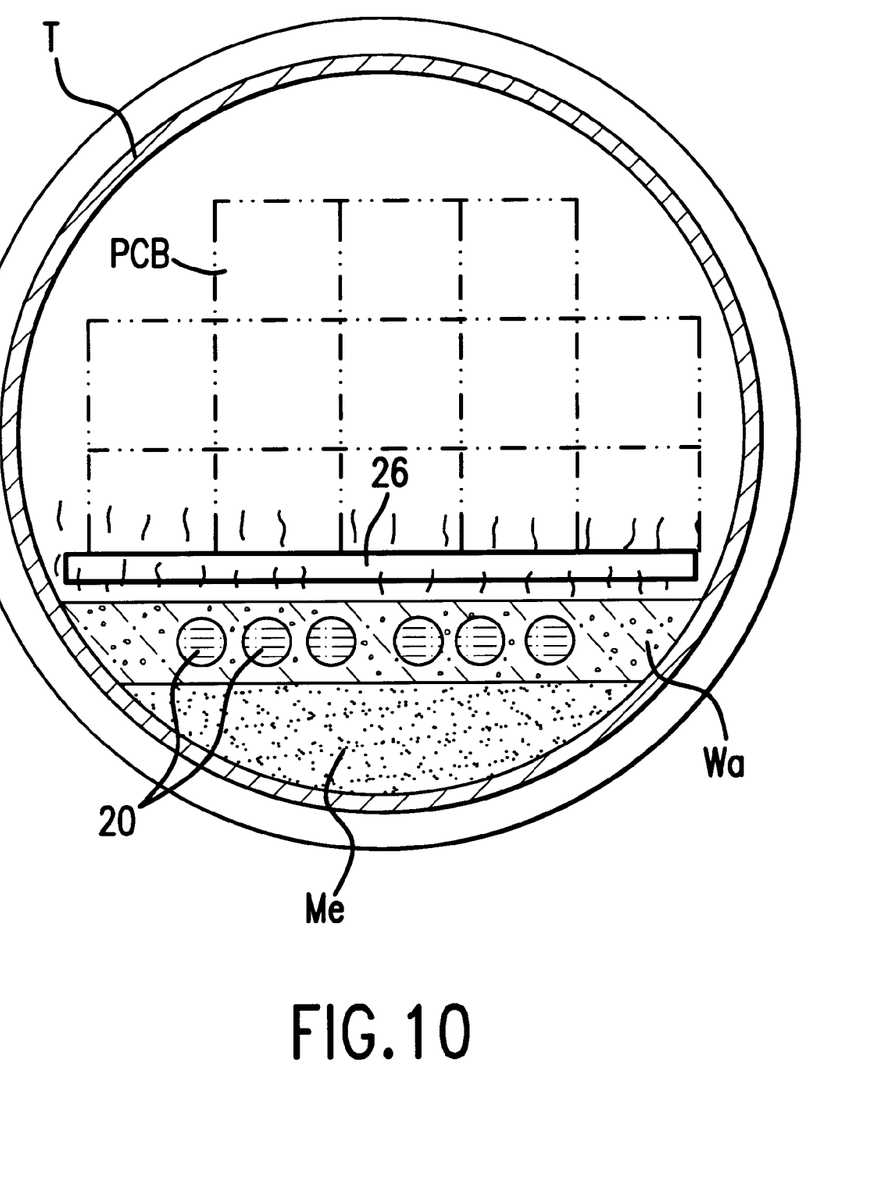
FIG. 10 is a sectional front view showing a state in which PCB solution in a vessel is mounted on the table 26 and processed.

FIG. 10 shows a state wherein a vessel holding a PCB solution is mounted on the table 26 and processed.

Figure 11:
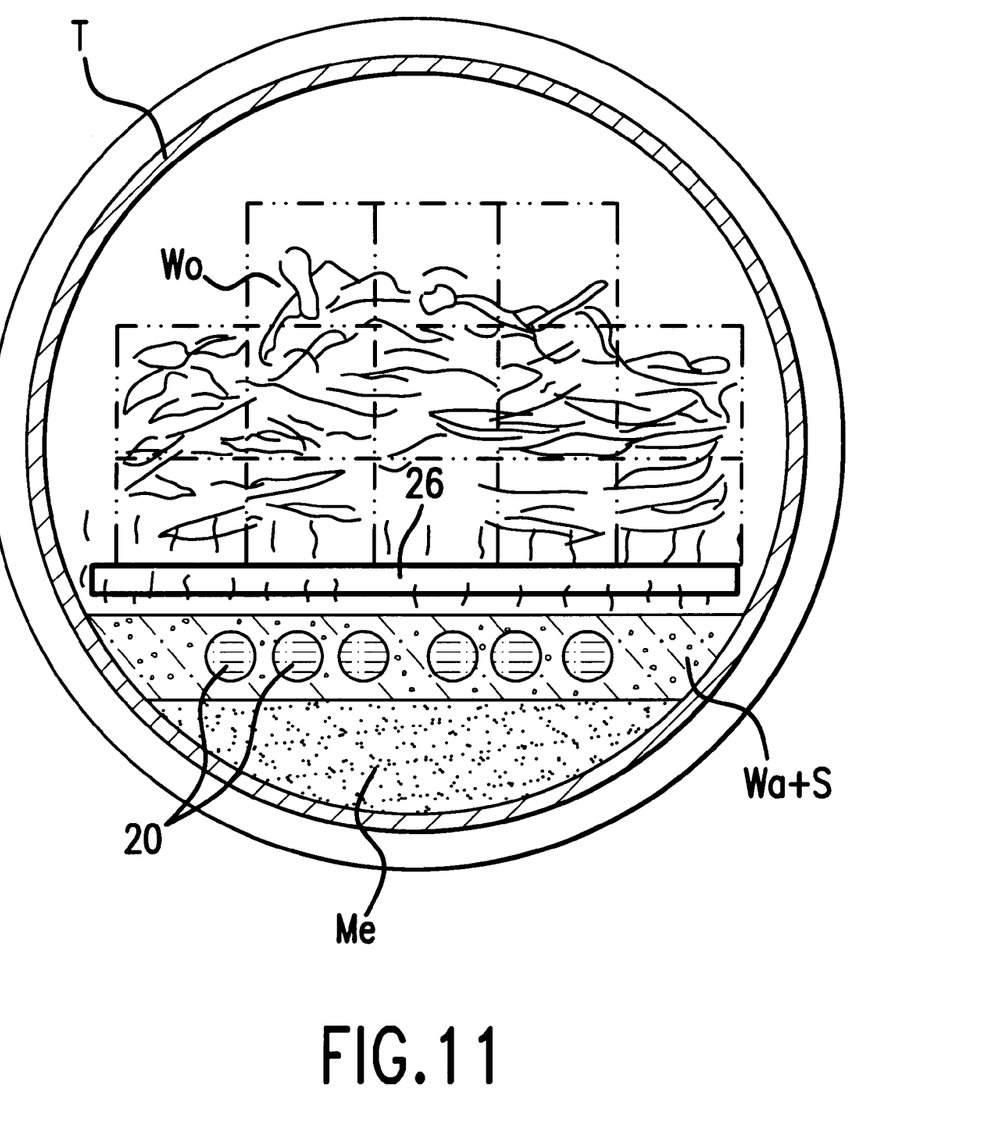
FIG. 11 is a sectional front view showing fish, bones of animals or so on are mounted on the table 26 and processed.

FIG. 11 shows a state wherein fish, bones of animals, etc. are mounted on the table 26 and processed.

The embodiments are exactly like the others previously described because a vapor of methylene chloride solvent solution Me and water Wa fumigates and processes a substance. Although the substances on the table 26 are different from each other.

In the method and equipment for disposal of waste W mixed synthetic resin materials m shown in FIG. 9, methylene chloride vapor and water vapor permeate the waste W mixed synthetic resin so as to dissolve synthetic resin into a state that synthetic resin in the waste W is easily dissolved. Thus, synthetic resin in garbage, such as a trash bag, a polyethylene terephthalate bottle, a mat for wrapping a daily dish, plastic wrap, a plastic vessel, etc. can be separated out with no hand in the steps of the present disposal before incineration of garbage.

Adding surfactant to methylene chloride solution promotes an explosive vaporization of methylene chloride solution and a strong oxidization can be obtained at a low temperature. Also, the surfactant permits pouring of resolved and decomposed synthetic resin from the garbage, so that the time for the disposal thereof in the treatment tank + can be shortened.

Also, mixing surfactant with water and methylene chloride solution enables promotion of vaporization of methylene chloride solution and water at a low temperature. Water usually vaporizes at 100° C., but it can vaporize at a lower temperature as a result of adding a surfactant thereto. Therefore, sufficient pressure can be obtained at a temperature ranging from 50 to 150° C., and a high temperature over 150° C. is not required for obtaining a high pressure.

Chlorine ion (Cl–) and methylene free radical (—$CH_2$—) is generated easily and the time until extinction by chemical combination is extended as a result of generating methylene chloride vapor and water vapor under vacuum conditions or at a low pressure in the treatment tank, which has been deaerated before processing by a vacuum pump, whereby, a strong oxidization can be maintained.

A temperature for heating a mixture solution ranging from 50 to 150° C. enables generation of chlorine ion (Cl–) and methylene free radical (—$CH_2$—) at a low temperature and prevents damage to the waste W mixed synthetic resin.

Further, methylene chloride vapor and water vapor permeate a garbage or vegetation so as to dissolve their organic cells, whereby an essence of vegetation and fat components are easily dissolved outside the treatment tank. Thus, an essence of vegetation is easily extracted, and in the case of processing garbage, water and fat is easily separated from fiber, so that the time of processing for fermentation can be reduced.

Furthermore, since a mixture of water Wa, surfactant solution S and methylene chloride solution Me is prepared and a gas of methylene chloride Me is fed to waste W, such as garbage or vegetation after passing through the layers of both water Wa and surfactant solution S. $Cl_2$ as a constituent of HCL is absorbed into the water and inflicts no damage to garbage or vegetation W, because of reduction of the rate of generation thereof. Methylene chloride gas can be easily absorbed and recovered by reducing pressure in the treatment tank T to be negative or a vacuum after processing. The structure of garbage or vegetation of waste W is not damaged after recovery of methylene chloride.

Recovery of methylene chloride gas is performed promptly and completely and the methylene chloride can be re-used following cooling and liquefaction. In this way, consumption of methylene chloride solution Me and the cost of processing can be reduced.

A temperature range for heating the mixture solution of from 50 to 150° C. enables easy extraction of a natural essence of vegetation without a chemical change of the essence, so that this essence is safe and can be used as a health food. Also, the necessary amount of heat can be reduced.

A method of decomposing PCB shown in FIG. 10 according to the present invention described above exhibits the following effects.

Conventionally, PCB is hardly decomposed by exposing it to ultraviolet rays or processing by heat at a high temperature higher than 1200° C. However, in the present invention, a mixture solution of methylene chloride solution, capable of re-use by recovery, and water is heated at a temperature lower than 100° C., near room temperature, so as to generate a strong oxidization of chlorine ion (Cl–) by which chains of PCB can be decomposed, whereby, processing for decomposing PCB can be performed at a low cost.

A method of removal of oil or fat components from fish or bones of animals shown in FIG. 11 according to the present invention described above exhibits the following effects.

Removal of oil or fat components from fish or bones of animals is performed by using methylene chloride solution and water. Methylene chloride is then liquefied by cooling and is separated from the water and fat. Therefore, the cost of methylene chl o ride can be reduced and it does not pollute the oil or fat and drainage.

Also, methylene chloride solution, which can be recovered easily after these processes, can be used again as a solvent solution. Therefore, the cost of processing can be reduced.

Because the processing temperature is low, from 50 to 150° C. fish and bones of animals of waste W is not calcinated. Therefore, the value as powdered bone or fish meal is not diminished. Also, the cost of energy for the disposal thereof can be reduced by processing at a low temperature and not so high a pressure.

In a short time of about 20 hours, animal bones or fish of waste W are processed, whereby, animal bones or fish, which are conventionally incinerated in spite of removal of oil or fat components, can be easily processed at a low cost. Reduction of waste and effective use of animal bones or fish W as a resource, which has been incinerated conventionally, can be obtained.

Conventionally, pig bone, cow bone and so on are ground into powder without completely removing oil or fat components. Therefore, the powder is perishable and generates a stench because of the oil or fat the on. By processing for removal of fat, as in the present invention, powdered bones of high purity can be made and provided as high-grade phosphatic fertilizer.

Also, conventionally, fish is dried for fish meal without removing oil or fat components, so that a smell of fish remains. Thus, there is a problem that the meat of a cow or a pig, which eats the fish meal, also smells of fish. In the present invention, the smell is avoided by removing oil or fat components from the fish, whereby, the fish meal can be sold as high-grade fish meal.

Further, animal oil or fat and fish oil are extracted largely from animal bones or fish so as to extract effective materials for a human body, such as docosahexaenoic acid, hexapentaenoic acid and so on, which can be used as a medicine. Accordingly, animal oil or fat and fish oil, which have not previously been of use, can be used effectively.

Furthermore, conventionally, animal bones or fish W is ground into powder as it is. Then, it is boiled and filtered for extracting animal oil or fat or fish oil. However, by the present invention, oil or fat components can be extracted from animal bones or fish without altering the shape thereof. Thus, animal oil or fat or fish oil can be easily extracted.

Industrial Applicability

In accordance with the present invention, water and methylene chloride solution, as a halogenated solvent solution or chlorine solvent solution are mixed and disposed in a treatment tank so as to generate a vapor. Methylene chloride solvent vapor, water vapor, and occasionally surfactant solvent vapor permeate a waste synthetic resin film W. Then, chlorine ion (Cl-) and methylene free radical ($—CH_2—$) generated from the vapors in a vacuum interior of the treatment tank operate as strong oxidizers for a longer time than usual, so as to dissolve or decompose synthetic resin by dividing a long chain molecule of hydrocarbon radical and changing it into a carbohydrate, alcohol and water. Whereby, harmful components of PCB, oil or fat components of animal bones or fish, and the like are dissolved or decomposed.

In the method of and equipment for the disposal of waste synthetic resin film according to the present invention, a surfactant solvent solution is mixed with methylene chloride solution and water, so that said surfactant solvent vapor eases the outflow and separation of synthetic resin after it is dissolved. Vapors can be generated at a low temperature by mixing the surfactant solvent solution into the methylene chloride solution and water so as to lower the processing temperature, whereby, the waste synthetic resin film W is not calcinated.

Methylene chloride vapor, water vapor, and occasionally surfactant solvent vapor of the present invention permeate the waste polyvinyl chloride W. Then, chlorine ion (Cl-) and methylene free radical ($—CH_2—$) generated from the vapors in a vacuum interior of the treatment tank operate as strong oxidizers for a longer period of time than usual, so as to dissolve or decompose synthetic resin by dividing a long chain molecule of a hydrocarbon radical and changing it into a carbohydrate, alcohol and water.

In the method of and equipment for the disposal of waste polyvinyl chloride according to the present invention, surfactant solvent solution is mixed into methylene chloride solution and water, so that said surfactant solvent vapor eases the separation and melting of chlorine after the waste is dissolved. Vapors can be generated at a low temperature by mixing the surfactant solvent solution into the methylene chloride solution and water so as to lower the processing temperature, whereby, the waste polyvinyl chloride W is not calcinated.

The waste polyvinyl chloride W is oxidized and dissolved by chlorine ion (Cl-) and methylene free radical ($—CH_2—$) generated from methylene chloride vapor and water. Then, it is removed from the table 26. The dissolved waste polyvinyl chloride W has been changed into a solid state when the table 26 is taken out from the treatment tank. Its contents is one-several tenth as large as its first contents by dissolving and compressing. The solid can be thrown into a furnace or a burner as solid fuel.

The waste polyvinyl chloride W dissolved and compressed according to the present invention is extracted separately and decomposed by heat, after that, only the petroleum component is extracted. Thus, used it can be as the same fuel of kerosene and can be provided as raw material for a garbage furnace or the production of electric power by incineration or heating by incineration.

Figure 8:
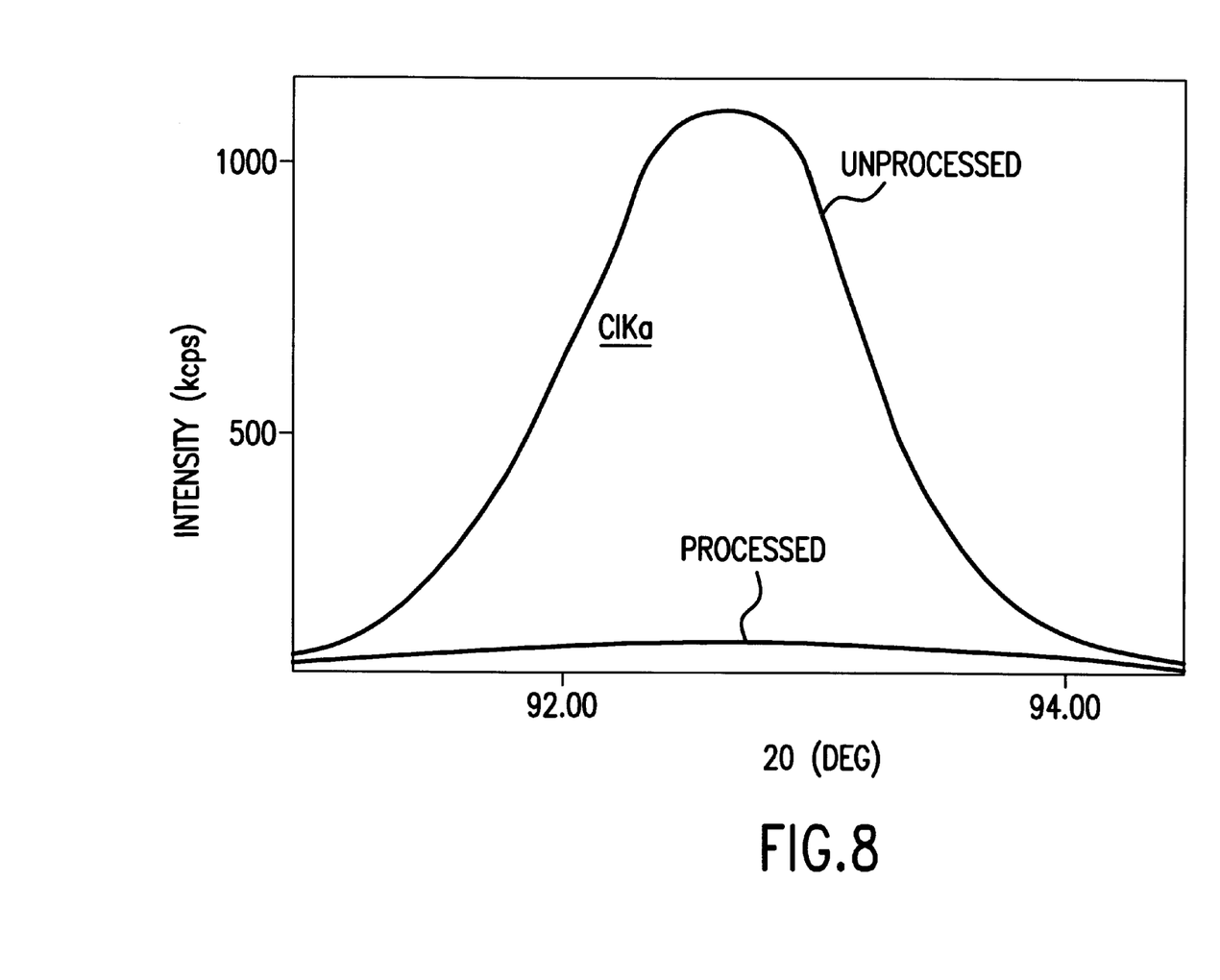
FIG. 8 is a graph showing reduction of chlorine when polyvinyl chloride is processed by a method and an equipment for the disposal of material such as waste according to the present invention.

Also, according to the qualitative analysis findings of all the chemical elements shown in FIG. 8, chlorine is reduced to one-tenth as much as it is at first when a chloric synthetic resin film, such as polyvinyl chloride, is processed by the present invention. It is conceivable that chlorine composing a component of waste polyvinyl chloride is vaporized and resolved by a chlorine ion (Cl-) and methylene free radical ($—CH_2—$). It is then acted upon by water so as to change it into hydrochloric acid, etc. and be recovered into the mixture solution.

Therefore, generation of chlorine gas is minimal when a processed solid or liquid is burned up.

Methylene chloride vapor, water vapor, and occasionally surfactant vapor of the present invention permeate garbage mixed with synthetic resin. A chlorine ion (Cl-) and methylene free radical ($—CH_2—$) generated from the vapors in the vacuum interior of the treatment tank operate as strong oxidizers for a longer time than usual, so as to dissolve or decompose synthetic resin by dividing a long chain molecule of hydrocarbon radical and changing it into a carbohydrate, alcohol and water, with the remaining garbage.

Only a portion of synthetic resin m of FIG. 9 is oxidized and dissolved by a chlorine ion (Cl–) and methylene free radical (—CH$_2$—) generated from methylene chloride vapor and water vapor of the present invention. The dissolved synthetic resin m does not combine with methylene chloride solution, water and surfactant solvent solution chemically so that they are in layers, after that, synthetic resin m can be easily separated and extracted.

Also, a chlorine ion permeates PCB to an extent, because permeation of a chlorine ion (Cl–) is strong. By agitation of PCB solution, a large amount of PCB solution is oxidized and chains of PCB are changed into cloudy matter in alcohol state. Whereby, PCB can be changed into material that will not harm the human body.

I claim:

1. Method for the disposal of a material comprising mixing a halogenated solvent solution having a specific gravity not less than 1 and a boiling point not more than 100° C., with water, forming a plural layer mixture solution from mixing the halogenated solvent solution and water, said plural layer mixture solution comprising an upper water layer and a lower halogenated solvent solution layer, placing the material above said upper water layer without immersing said material in said plural layer mixture solution, heating said plural layer mixture solution to generate a halogenated solvent vapor, passing said halogenated solvent vapor through said upper water layer, contacting said halogenated solvent vapor with said material after said halogenated solvent vapor has passed through said upper water layer to fumigate said material with said halogenated solvent vapor, and oxidizing said material by said halogenated solvent vapor.

2. Method for the disposal of a material comprising mixing a chloride solvent solution, having a specific gravity not less than 1 and a boiling point not more than 100° C., with water, forming a plural layer mixture solution from mixing the halogenated solvent solution and water, said plural layer mixture solution comprising an upper water layer and a lower chloride solvent solution layer, placing the material above said upper water layer without immersing said material in said plural layer mixture solution, heating said plural layer mixture solution to generate a chloride solvent vapor, passing said chloride solvent vapor through said upper water layer, contacting said chloride solvent vapor with said material after said chloride solvent vapor has passed through said upper water layer to fumigate said material with said chloride solvent vapor, and oxidizing said material by said chloride solvent vapor.

3. The method of claim 2, wherein the material is at least one material selected from the group consisting of PCB, animals and fish.

4. The method according to claim 3, further comprising disposing said plural layer mixture solution and said material in a container and evacuating said container to create a vacuum prior to said step of heating said plural layer mixture solution, wherein said step of heating occurs at a temperature between 50 and 150° C.

5. Method for the disposal of a material comprising mixing a methylene chloride solution with water to form a plural layer mixture solution, said mixture solution comprising an upper water layer and a lower methylene chloride solution layer, placing the material above said upper water layer without immersing said material in said plural layer mixture solution, heating said plural layer mixture solution to generate a methylene chloride vapor, passing said methylene chloride vapor through said upper water layer, contacting said methylene chloride vapor with said material after said methylene chloride vapor has passed through said upper water layer to fumigate said material, and oxidizing said material by said methylene chloride vapor.

6. The method of claim 5, wherein the material is at least one material selected from the group consisting of a synthetic resin film, a synthetic resin, garbage, vegetation, PCB, animals and fish.

7. The method of claim 6, wherein said step of heating said plural layer mixture solution occurs at 50–150° C.

8. The method of claim 6, wherein the weight ratio of methylene chloride solution to water is set approximately between 1:1 and 4:1.

9. The method of claim 6, wherein said a polyvinyl chloride film.

10. The method of claim 9, wherein chloride is removed from said polyvinyl chloride film during said step of oxidizing.

11. The method set forth in claim 6, 7, 8, 9 or 10, further comprising disposing said plural layer mixture solution and said material in a container, evacuating said container to create a vacuum, and commencing the disposal of said material at a low pressure.

12. The method set forth in claim 1, 2 or 5, further comprising disposing said plural layer mixture solution and said material in a container, evacuating said container to create a vacuum, and commencing the disposal of said material at a low pressure.

13. The method set forth in claim 1, 2 or 5, wherein said step of heating said plural layer mixture solution occurs at 50–150° C.

14. The method set forth in claim 1, 2 or 5, wherein water vapor is generated from heating said plural layer mixture solution, and further comprising contacting said water vapor with said material to fumigate and oxidize said material.

15. The method set forth in claim 14, further comprising mixing a surfactant solution during said step of mixing, wherein said upper water layer further comprises said surfactant solution and surfactant solution vapor is generated from heating said plural layer mixture solution, and further comprising contacting said surfactant solution vapor with said material to fumigate and oxidize said material.

16. The method set forth in claim 15, wherein a ratio by weight of the halogenated solution to water and surfactant solution is about 5:4.5:0.5.

17. Method for the disposal of animal bones or fish comprising mixing a methylene chloride solution, a surfactant solvent solution and water to form a plural layer mixture solution, placing said animal bones or fish proximate to said plural layer mixture solution, said plural layer mixture solution comprising an upper layer of water and surfactant solvent solution and a lower layer of methylene chloride solution, heating said plural layer mixture solution to generate methylene chloride vapor, passing said methylene chloride vapor through said upper layer of water and surfactant solvent solution, generating water vapor and surfactant solution vapor, contacting said animal bones or fish with said water vapor and surfactant solution vapor, and with said methylene chloride vapor after said methylene chloride vapor has passed through said upper layer of water and surfactant solvent solution to fumigate said animal bones or fish, and oxidizing said animal bones or fish by said vapors to extract oil or fat components from said animal bones or fish.

18. The method of claim 17, further comprising disposing said mixture solution and said animal bones or fish in a container and removing the pressure in said container to create a vacuum prior to said step of heating said mixture solution wherein said step of heating occurs at a temperature between 50 and 150° C.

19. The method of claim 17, wherein the weight ratio of methylene chloride solution to water is set approximately between 1:1 and 4:1.

* * * * *